Jan. 18, 1944.     F. R. SIAS     2,339,606
GYROSCOPE ERECTING DEVICE
Filed Aug. 11, 1942
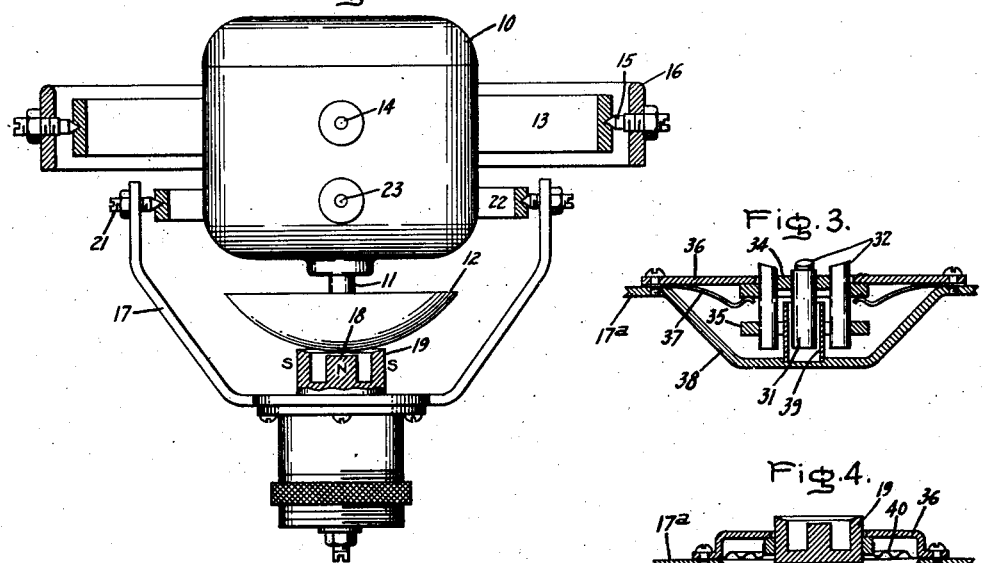
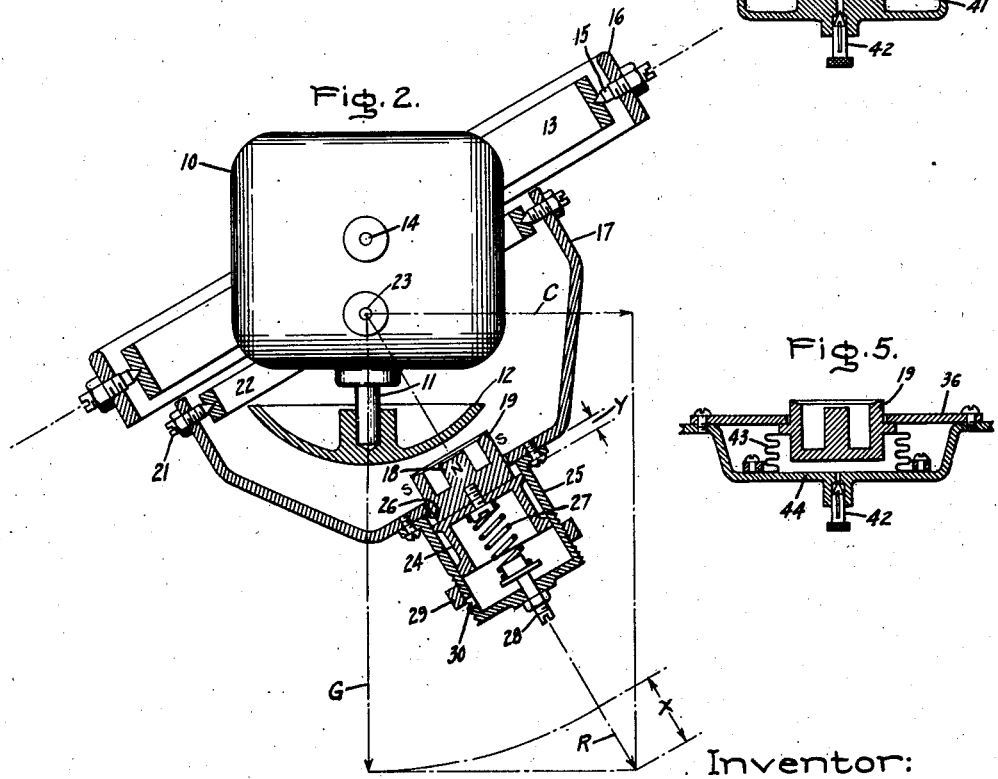
Inventor:
Frederick R. Sias,
by Harry E. Dunham
His Attorney.

Patented Jan. 18, 1944

2,339,606

UNITED STATES PATENT OFFICE 2,339,606

GYROSCOPE ERECTING DEVICE

Frederick R. Sias, Marblehead, Mass., assignor to General Electric Company, a corporation of New York Application August 11, 1942, Serial No. 454,444

5 Claims. (Cl. 74—5)

My invention relates to gyroscopes and particularly to an improved erecting device therefor with automatic means for suppressing the erecting force when the structure on which the gyroscope is mounted is accelerated.

Gyroscope instruments used on ships, for example, artificial horizon instruments for airplanes, are provided with erecting means to assist in maintaining the axis of the gyroscope rotor in a vertical direction. Such means may take the form of a device for applying an unsymmetrical tangential retarding force on the rotating element of the gyroscope when the rotating axis of the gyroscope departs from the vertical and for this purpose a portion of the erecting means may be pendulous and be supported as a universal pendulum so as to normally hang in a vertical position in line with the true vertical axis of rotation of the gyroscope rotor.

Such pendulous erecting means, however, will depart from the true vertical position when the mount for the gyroscope instrument is accelerated, as for example, when the airplane on which it is mounted takes a sharp turn and if the force intended for erecting the gyroscope is applied under these conditions it tends to de-erect rather than to erect the gyroscope.

My invention relates to means for removing the erecting force when the pendulous erecting means thus departs from a vertical position.

The features of my invention which are believed to be novel and patentable will be pointed out in the claims appended hereto. For a better understanding of my invention reference is made in the following description to the accompanying drawing illustrating in Fig. 1 portions of a gyroscope instrument having a magnet erecting device to which my invention has been applied; Fig. 2 shows the gyroscope with its support and erecting device tipped from the vertical as in a banking operation; Figs. 3, 4 and 5 show different ways of movably supporting the magnet element of the erecting device.

Referring to the drawing, 10 represents a gyroscope of any suitable type. For example, 10 may represent the stator of an electric motor the rotor of which drives the shaft 11 and erecting element 12. The gyroscope 10 is mounted in a gimbal ring 13 by horizontal pivots at right angles to the plane of the drawing and one of which is shown at 14. The gimbal rings and certain other of the parts are shown in section for illustration purposes. Gimbal ring 13 is in turn mounted in pivots 15 of a supporting ring 16 on a normally horizontal axis at right angles to pivots 14. Hence, the gyroscope is mounted for movement about either horizontal axis within supporting ring 16. The gyroscope 10 supports the relatively stationary member of the erecting device by means of the ball 17, pivots 21, gimbal ring 22 and pivots 23. Such erecting member comprises a magnet having upwardly extending pole pieces 18 and 19 of opposite polarity. The pole piece 19 is in the form of a ring concentric to the center pole piece 18 and these pole pieces are positioned closely adjacent the rotating member 12 of the erecting device so that the flux of the magnet normally penetrates the rotating member 12. The magnet is preferably a permanent magnet so as to avoid the necessity of a winding and a source of D.-C. supply. The rotary member 12, which is in the shape of a section of hollow sphere having its center coinciding with the point of intersection of the two axes of rotation of the ball 17, is preferably of conducting material in which case the erecting force is produced by eddy currents therein. If the member 12 were made of steel the erecting force would be produced by magnetic hysteresis action.

It will be noted that in the position of the parts shown in Fig. 1, which is the normal position, the permanent magnet is concentric with respect to the axis of rotation of the gyroscope rotor. Flux passing between the circular pole piece 19 and the center pole piece 18 and entering the rotating conductor 12 will produce no eddy currents or damping since in this symmetrical condition the flux through, or in the conductor 12 does not shift through the conductor. If, however, the gyroscope axis is tipped from the vertical in any direction, the flux distribution will be unsymmetrical with respect to the axis of rotation of the conductor 12 and flux will shift through or be cut by conductor 12 and eddy current damping will be set up also unsymmetrically with respect to the axis of rotation resulting in a tangential precessing force tending to return the axis of the gyroscope rotor to the vertical. This general type of erecting device is disclosed in British Patent No. 359,071 of 1931.

In order that the erecting magnet shall normally remain in correct erecting position it is mounted pendulously as a universal pendulum about two horizontal axes at right angles to each other as described and illustrated. It is thus seen that the pendulous erecting magnet assembly is free to assume the vertical position as a universally pivoted gravity pendulum, which is the position represented in Fig. 1, regardless of departures from the horizontal of its two pivoted axes from the horizontal. Thus under ordinary circumstances both the gyro 10 and the pendulum assembly 17 with its magnet will retain the vertical axial position shown in Fig. 1, even though the support 16 be tipped. The gyro will retain this position by reason of its operation as a gyroscope and not because it may or may not be pendulous and the pendulum assembly 17 will tend to retain this position because it is pendulous. Hence, under normal conditions the erecting device will function to maintain correct the vertical position of the gyroscope.

Where, however, the gyroscope instrument is used on an airplane or other ship which is subject to quick turns acceleration and the like, the pendulum will be subject to a force other than gravity which will at times cause the pendulum to assume other positions than that represented in Fig. 1. When moving from the vertical position shown to some other position the pendulum will swing about an axis such as the axis of pivots 23 and in so doing the magnet will be acted upon by centrifugal force and the faster the swing, the greater will be the departure from the vertical and the greater will be the centrifugal force. I make use of such centrifugal force to withdraw the magnet from the vicinity of the conductor 12 and thus substantially eliminate the erroneous erecting force at such times as the pendulum departs from the vertical. This is illustrated in Fig. 2 where it is assumed that the ship on which the gyroscope is mounted in making a banking turn to the left causes the pendulous magnet assembly to swing to the right. Let the vector G represent the force of gravity and C the acceleration or centrifugal force due to the turn which is acting on the magnet and its mounting. R thus represents the resultant force which is greater than G by the amount X. Hence the change in force acting on the magnet to move it away from conductor 12 may be represented by X. Calculations indicate that this force X is about one-fourth the mass of the magnet and its mounting parts which move with it. Hence the magnet moves away from the conductor 12 by an amount which may be represented by the distance $y$.

One way of mounting the magnet to accomplish this is shown in Fig. 2. The magnet is mounted on the piston 24 of a dash pot 25. The axis of the dash pot and hence the line of movement of piston 24 is radial with respect to the point about which the pendulum pivots. The piston 24 is normally held upwardly towards the conductor 12 against a seat at 26 by a light spring 27 which is adjustable by a screw plug 28. The damping of the dash pot is adjustable by means of a ring 29 which is threaded on the dash pot and thus may be adjusted to cover more or less of a vent opening 30 in the dash pot.

As the pendulum is swung away from the vertical, centrifugal force thus moves the magnet away from the conductor 12 to eliminate or greatly reduce the erecting force. By carefully proportioning the parts to reduce friction to a minimum and adjusting the spring and damping in relation to the average accelerating forces encountered, undesirable erecting forces which would otherwise occur when the pendulous erecting magnet departs from the vertical may be largely eliminated without interfering with the production of desirable erecting forces when the erecting magnet is in a vertical position. It will be evident that as soon as the magnet returns to a vertical position the magnet will be returned to erecting position close to conductor 12 by the spring 27. The magnet should be so movably mounted that friction and any binding tendency are reduced to a minimum. Also, it should be so damped that vibration, bumps and minor changes in direction will not cause material displacement.

Fig. 3 represents a modified form of movable permanent magnet system. Here five cylindrical permanent magnets are used, one, 31, in the center, and four, 32, in a circle about the center magnet. The upper ends of the magnets are supported by a non-magnetic holder 34 and the lower ends of the outer magnets by a non-magnetic holder 35. The normal position of this permanent magnet field assembly is that shown where the holder 34 is seated against a stop plate 36 by springs 37. The stop plate is secured to the bail 17a which also supports an underslung part 38 carrying a damping and guide cup 39 into which the center magnet 31 telescopes as a plunger. The clearance between the magnet 31 and the inner wall of cup 39 will be made such as to provide the desired amount of damping.

Fig. 4 shows a magnet of the form shown in Fig. 1 mounted at the center of a flexible diaphragm 40. The diaphragm 40 with the magnet 19 closes the upper end of an air chamber 41 formed in the underslung part of the bail 17a. Diaphragm 40 normally holds the magnet in the active position shown against the stop plate 36. Damping is controlled by an adjustable air vent 42.

Fig. 5 shows a movable magnet assembly much like Fig. 4 except a bellows spring 43 is used to support the magnet and form a wall portion of the air chamber. In the modifications of Figs. 3, 4 and 5 the spring members are proportioned to hold the magnet up against its seat close to conductor element 12 under normal conditions, but to yield under forces of acceleration to allow the magnet to move away from the element 12. The extent of such movement may be limited by the dimensions of the parts as indicated. For example, in Fig. 5 the underslung wall section 44 serves as a stop to limit the downward movement of the magnet 19.

What I claim as new and desire to secure by Letters Patent of the United States, is:

1. A gyroscope mounted for universal movement, means for producing an erecting force on the gyroscope to maintain the axis of rotation of the gyroscope substantially vertical, said means including a metallic member rotated by the gyroscope and a relatively stationary magnet for producing a flux in the metallic member, said magnet being mounted on and comprising a part of a universal pendulum, the metallic member and magnet being closely adjacent each other in substantial alignment with the axis of rotation of the gyroscope under normal conditions, said magnet being mounted on said pendulum so as to be movable away from the metallic member, resilient means for normally preventing such movement, but yielding under the action of centrifugal force when the pivot of said pendulum is accelerated to permit such movement, said spring returning the magnet towards the metallic member when such force ceases.

2. In a gyroscope system a universally supported gyroscope, a pendulum universally supported from said gyroscope, a magnet carried on said pendulum below said gyroscope for normally producing an erecting force on said gyroscope whenever the axis of rotation of the gyroscope departs from the vertical, and means responsive to centrifugal force due to the acceleration of said system for suppressing the erecting force of said magnet when the pendulum departs from the vertical.

3. In a gyroscope system, a universally supported pendulum including a magnet thereon for producing a gyroscope erecting force, said magnet being mounted on the pendulum so as to move towards and away from the pivot of the pendulum, the movement of said magnet away from the pivot of the pendulum being responsive to centrifugal force, stops for determining the limits of such movement, a spring urging said magnet towards the pendulum pivot, and damping means for determining the rate of such movement.

4. In combination with a universally mounted gyroscope system, a universally mounted pendulum, means on the gyroscope system and pendulum for producing a magnetic erecting force on the gyroscope system when its axis of rotation departs from the vertical and means responsive to centrifugal force acting on the pendulum when the system and pendulum are accelerated sufficiently to cause the pendulum to depart from a vertical position to suppress such magnetic erecting force until the pendulum returns to a vertical position.

5. A universally mounted gyroscope intended to have its rotating axis vertical, an erecting device for said gyroscope comprising a member of conducting material rotated with the rotating element of the gyroscope, and magnetic field producing means mounted as a universal pendulum in relation to the gyroscope for producing a gyroscope erecting force magnetic field in said rotating member when the axis of the gyroscope departs from the vertical, said universal pendulum magnetic field producing means comprising a pendulum supporting structure, magnetic field producing means movably supported thereon so as to move towards and away from the said member of conducting material and a resilient member for biasing the magnetic field producing member towards such member for conducting material, said resilient member yielding when the magnetic field producing member is acted upon by centrifugal force to allow movement of the magnetic field member away from said member of conducting material whereby erroneous erecting forces are minimized.

FREDERICK R. SIAS.